United States Patent
Xiao et al.

(10) Patent No.: US 9,602,005 B2
(45) Date of Patent: *Mar. 21, 2017

(54) SENSING A PHASE-PATH CURRENT IN A COUPLED-INDUCTOR POWER SUPPLY

(71) Applicant: Intersil Americas LLC, Milpitas, CA (US)

(72) Inventors: Shangyang Xiao, Milpitas, CA (US); Weihong Qiu, San Jose, CA (US); Jun Liu, San Jose, CA (US)

(73) Assignee: Intersil Americas LLC, Milpitas, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 14/203,017

(22) Filed: Mar. 10, 2014

(65) Prior Publication Data

US 2014/0191738 A1 Jul. 10, 2014

Related U.S. Application Data

(63) Continuation of application No. 12/189,112, filed on Aug. 8, 2008, now Pat. No. 8,704,500.

(60) Provisional application No. 61/072,287, filed on Mar. 27, 2008, provisional application No. 60/964,792, filed on Aug. 14, 2007.

(51) Int. Cl.
*H02M 3/158* (2006.01)
*H02M 1/00* (2006.01)

(52) U.S. Cl.
CPC .. *H02M 3/1584* (2013.01); *H02M 2001/0009* (2013.01)

(58) Field of Classification Search
CPC .................................................. H02M 3/1584
See application file for complete search history.

(56) References Cited

U.S. PATENT DOCUMENTS

| 4,000,509 A | 12/1976 | Jarvela |
| 4,088,942 A | 5/1978 | Miko |

(Continued)

FOREIGN PATENT DOCUMENTS

| JP | 56023725 | 3/1981 |
| WO | 2006/026674 | 3/2006 |

OTHER PUBLICATIONS

Czogalla (2003) "Automotive Application of Multi-Phase Coupled-Inductor DC-DC Converter" IAS Conference, Oct. 12-16, 3:1524-1529.

(Continued)

*Primary Examiner* — Emily P Pham
(74) *Attorney, Agent, or Firm* — Fogg & Powers LLP

(57) ABSTRACT

An embodiment of a power supply includes an output node, inductively coupled phase paths, and a sensor circuit. The output node is configured to provide a regulated output signal, and the inductively coupled phase paths are each configured to provide a respective phase current to the output node. And the sensor circuit is configured to generate a sense signal that represents the phase current flowing through one of the phase paths. For example, because the phase paths are inductively coupled to one another, the sensor circuit takes into account the portions of the phase currents induced by the inductive couplings to generate a sense signal that more accurately represents the phase current through a single phase path as compared to conventional sensor circuits.

23 Claims, 6 Drawing Sheets

(56) References Cited

U.S. PATENT DOCUMENTS

| | | | |
|---|---|---|---|
| 4,631,471 A | 12/1986 | Fouad et al. | |
| 4,710,798 A | 12/1987 | Marcantonio | |
| 4,713,742 A | 12/1987 | Parsley | |
| 5,204,809 A | 4/1993 | Andresen | |
| 5,414,401 A | 5/1995 | Roshen et al. | |
| 5,631,822 A | 5/1997 | Silberkleit et al. | |
| 5,764,500 A | 6/1998 | Matos | |
| 5,790,005 A | 8/1998 | Santi et al. | |
| 5,889,373 A | 3/1999 | Fisher et al. | |
| 5,929,692 A | 7/1999 | Carsten | |
| 5,982,160 A | 11/1999 | Walters et al. | |
| 6,018,468 A | 1/2000 | Archer et al. | |
| 6,084,790 A | 7/2000 | Wong | |
| 6,144,194 A | 11/2000 | Varga | |
| 6,239,510 B1 | 5/2001 | Azimi et al. | |
| 6,271,650 B1 | 8/2001 | Massie et al. | |
| 6,272,023 B1 | 8/2001 | Wittenbreder | |
| 6,278,263 B1 | 8/2001 | Walters et al. | |
| 6,285,571 B1* | 9/2001 | Brooks | H02M 3/1584 323/272 |
| 6,362,986 B1 | 3/2002 | Schultz et al. | |
| 6,417,753 B1 | 7/2002 | Wolf et al. | |
| 6,549,436 B1 | 4/2003 | Sun | |
| 6,605,931 B2 | 8/2003 | Brooks | |
| 6,686,727 B2 | 2/2004 | Ledenev et al. | |
| 6,696,823 B2 | 2/2004 | Ledenev et al. | |
| 6,765,468 B2 | 7/2004 | Chen et al. | |
| 6,822,875 B2 | 11/2004 | Chan et al. | |
| 6,856,230 B2 | 2/2005 | Lu | |
| 6,873,237 B2 | 3/2005 | Chandrasekaran et al. | |
| 6,885,274 B2 | 4/2005 | Hsu et al. | |
| 6,980,077 B1 | 12/2005 | Chandrasekaran et al. | |
| 6,995,548 B2 | 2/2006 | Walters et al. | |
| 7,002,325 B2 | 2/2006 | Harris et al. | |
| 7,005,835 B2 | 2/2006 | Brooks et al. | |
| 7,026,798 B2* | 4/2006 | Cheung | H02M 3/1584 323/225 |
| 7,046,523 B2 | 5/2006 | Sun et al. | |
| 7,091,708 B2 | 8/2006 | Moussaoui | |
| 7,109,691 B2 | 9/2006 | Brooks et al. | |
| 7,136,293 B2 | 11/2006 | Petkov et al. | |
| 7,233,132 B1 | 6/2007 | Dong et al. | |
| 7,242,172 B2 | 7/2007 | Carlson et al. | |
| 7,301,314 B2 | 11/2007 | Schuellein et al. | |
| 7,327,128 B2 | 2/2008 | Dinh | |
| 7,352,269 B2 | 4/2008 | Li et al. | |
| 7,358,710 B2 | 4/2008 | Luo et al. | |
| 7,365,518 B2 | 4/2008 | Wiseman | |
| 7,394,233 B1 | 7/2008 | Trayling et al. | |
| 7,449,867 B2 | 11/2008 | Wu et al. | |
| 7,456,618 B2 | 11/2008 | Jain et al. | |
| 7,468,899 B1 | 12/2008 | Hopper et al. | |
| 7,508,182 B1 | 3/2009 | Chang | |
| 7,514,909 B2 | 4/2009 | Burstein et al. | |
| 7,567,163 B2 | 7/2009 | Dadafshar et al. | |
| 7,782,031 B2 | 8/2010 | Qiu et al. | |
| 7,808,355 B2 | 10/2010 | Nagano et al. | |
| 7,821,375 B2 | 10/2010 | Dong et al. | |
| 8,179,116 B2 | 5/2012 | Wei et al. | |
| 8,320,136 B2 | 11/2012 | Xing | |
| 8,570,009 B2 | 10/2013 | Wei et al. | |
| 8,704,500 B2 | 4/2014 | Xiao et al. | |
| 2003/0197585 A1 | 10/2003 | Chandrasekaran et al. | |
| 2003/0198067 A1 | 10/2003 | Sun et al. | |
| 2004/0051616 A1 | 3/2004 | Kiko et al. | |
| 2004/0113741 A1 | 6/2004 | Li et al. | |
| 2004/0140877 A1 | 7/2004 | Nakao et al. | |
| 2004/0160298 A1 | 8/2004 | Hsu et al. | |
| 2004/0178473 A1 | 9/2004 | Dentry et al. | |
| 2004/0239470 A1 | 12/2004 | Lu | |
| 2005/0001599 A1* | 1/2005 | Seo | H02M 3/1584 323/237 |
| 2005/0024179 A1 | 2/2005 | Chandrasekaran et al. | |
| 2005/0024838 A1 | 2/2005 | Maxwell | |
| 2005/0151614 A1 | 7/2005 | Dadafshar | |
| 2005/0174208 A1 | 8/2005 | Sato et al. | |
| 2005/0286270 A1 | 12/2005 | Petkov et al. | |
| 2006/0038549 A1 | 2/2006 | Mehrotra et al. | |
| 2006/0038650 A1 | 2/2006 | Mehrotra et al. | |
| 2006/0145800 A1 | 7/2006 | Dadafshar et al. | |
| 2006/0187684 A1 | 8/2006 | Chandrasekaran et al. | |
| 2006/0197510 A1 | 9/2006 | Chandrasekaran | |
| 2006/0250205 A1 | 11/2006 | De et al. | |
| 2007/0258213 A1 | 11/2007 | Chen et al. | |
| 2007/0273349 A1 | 11/2007 | Wei et al. | |
| 2007/0285200 A1 | 12/2007 | Hsieh | |
| 2008/0067990 A1 | 3/2008 | Wei | |
| 2008/0303495 A1 | 12/2008 | Wei et al. | |
| 2008/0309299 A1 | 12/2008 | Wei et al. | |
| 2008/0315982 A1 | 12/2008 | Wei et al. | |
| 2009/0058379 A1* | 3/2009 | Sreenivas | H02M 3/1584 323/241 |
| 2009/0059546 A1 | 3/2009 | Xing | |
| 2009/0108821 A1 | 4/2009 | Standing | |
| 2013/0081266 A1 | 4/2013 | Xing | |
| 2013/0293207 A1 | 11/2013 | Wei et al. | |

OTHER PUBLICATIONS

Dixon (1993) "Coupled Inductor Design", Unitrode Seminar, May 1993, Topic 8.

Finn (2004) "Applications and Equivalent Models for Coupled Inductor Parallel Interleaved Converters", AUPEC 2004, Brisbane, Australia, Sep. 26-29.

Li (2002) "Coupled-Inductor Design Optimization for Fast-Response Low-Voltage DC-DC Converters", IEEE APEC, Mar. 10-14, Dallas, Texas, 2:817-823.

Maksimovic (1998) "Modeling of Cross-Regulation in Converters Containing Coupled Inductors", IEEE APEC, Feb. 15-19, Anaheim, California, 1:350-356.

Park (1997) "Modeling and Analysis of Multi-Interphase Transformers for Connecting Power Converters in Parallel", IEEE PSEC, Jun. 22-27, St. Louis, Missouri, 2:1164-1170.

Wong (2000) "Investigating Coupling Inductors in the Interleaving QSW VRM", IEEE APEC, Feb. 6-10, New Orleans, Louisiana, 2:973-978.

Wu (2006) "Multi-Phase Buck Converter Design with Two-Phase Coupled Inductors", IEEE APEC, Mar. 19-23.

Xu (1996) "Analysis by Finite Element Method of a Coupled Inductor Circuit Used as Current Injection Interface", IEEE Workshop on Computers in Power Electronics, Aug. 11-14, Portland, Oregon.

Jieli Li, et al., "Using Coupled Inductors to Enhance Transient Performance of Multi-Phase Buck Converters", 2004 IEEE, pp. 1289-1293.

Anderson F. Hoke, et al., "An Improved Two-Dimensional Numerical Modeling Method for E-Core Transformers", Thayer School of Engineering, Found in IEEE Applied Power Electronics Conference, Mar. 2002, pp. 7.

Xiao et al. (2009) "Parasitic Resistance Current Sensing Topology for Coupled Inductors" pp. 14.

* cited by examiner

SENSING A PHASE-PATH CURRENT IN A COUPLED-INDUCTOR POWER SUPPLY

CLAIM OF PRIORITY

The present application is a Continuation of U.S. patent application Ser. No. 12/189,112, filed 8 Aug. 2008; which application claims priority to U.S. Provisional Application Ser. Nos. 60/964,792 filed on Aug. 14, 2007, and U.S. Provisional Application Ser. Nos. 61/072,287 filed on Mar. 27, 2008, all of the foregoing applications are incorporated herein by reference in their entireties.

SUMMARY

An embodiment of a power supply includes an output node, inductively coupled phase paths, and a sensor circuit. The output node is configured to provide a regulated output signal, and the inductively coupled phase paths are each configured to provide a respective phase current to the output node. And the sensor circuit is configured to generate a sense signal that represents the phase current flowing through one of the phase paths.

For example, because the phase paths are inductively coupled to one another, the sensor circuit takes into account the portions of the phase currents induced by the inductive couplings to generate a sense signal that more accurately represents the phase current through a single phase path as compared to conventional sensor circuits. The sense signal may be fed back to a power-supply controller, which regulates the output signal (e.g., an output voltage) at least partly in response to the fed-back sense signal.

DETAILED DESCRIPTION

Figure 1:
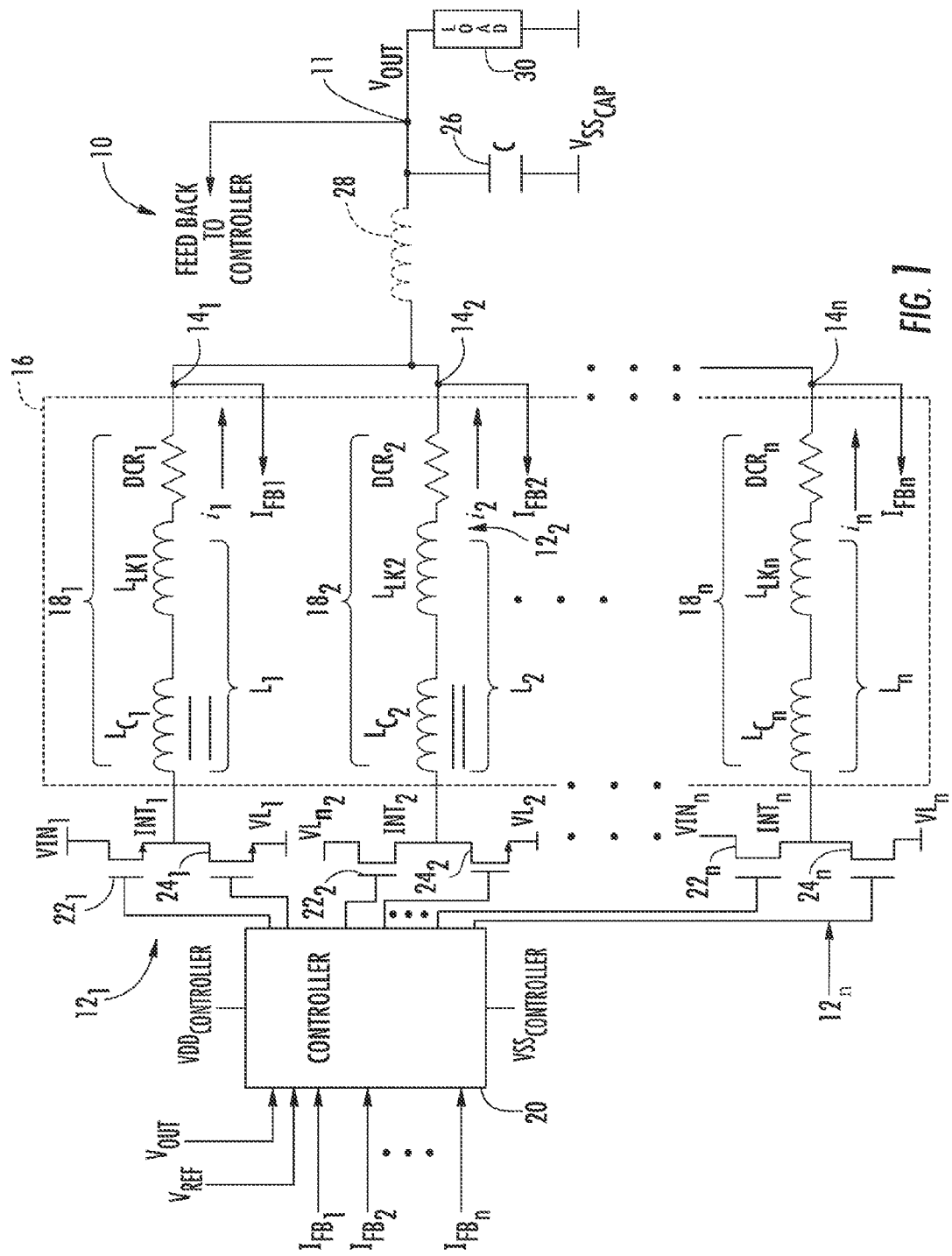
FIG. 1 is a schematic diagram of an embodiment of a coupled-inductor multiphase power supply that includes sense circuits for sensing the phase currents.

FIG. 1 is a schematic diagram of an embodiment of a coupled-inductor (CI) multiphase power supply 10, here a CI buck converter, which provides a regulated output voltage $V_{out}$ at a supply output node 11, and which includes phase paths (alternatively "phases") $12_1$-$12_n$ and current sensors $14_1$-$14_n$ for respectively sensing the currents $i_1$-$i_n$ through the phases. As discussed below in conjunction with FIGS. 2-5, the current sensors $14_1$-$14_n$ may each be coupled to respective multiple phase paths $12_1$-$12_n$ at nodes or locations other than the supply output node 11. For example, assume that some or all of the phases $12_1$-$12_n$ are magnetically coupled to one another. Coupling a current sensor 14 not only to a first phase 12 for which the sensor measures the phase current, but also to one or more second phases 12 to which the first phase is magnetically coupled, may allow the sensor to sense the current through the first phase more accurately than some conventional current sensors can.

The current sensors $14_1$-$14_n$ respectively generate sense signals $I_{FB1}$-$I_{FBn}$, which respectively represent the phase currents $i_1$-$i_n$. For example, each of the signals $I_{FB1}$-$I_{FBn}$ may be a respective voltage that has substantially the same signal phase as the corresponding phase current i and that has an amplitude that is substantially proportional to the amplitude of the corresponding phase current.

In addition to the current sensors $14_1$-$14_n$, the converter 10 includes a coupled-inductor assembly 16 having windings $18_1$-$18_n$, which are wound about a common core (not shown in FIG. 1) and which are magnetically coupled to one another via the core, a power-supply controller 20, high-side drive transistors $22_1$-$22_n$, low-side drive transistors $24_1$-$24_n$, a filter capacitor 26, and an optional filter inductor 28. A winding 18 and the high-side and low-side transistors 22 and 24 coupled to the winding at a phase intermediate node INT compose a respective phase 12. For example, the winding $18_1$ and the transistors $22_1$ and $24_1$ compose the phase $12_1$.

The controller 20 may be any type of controller suitable for use in a multiphase CI power supply, is supplied by voltages $VDD_{Controller}$ and $VSS_{Controller}$, and receives the regulated output voltage $V_{out}$, a reference voltage $V_{ref}$ and the sense signals $I_{FB1}$-$I_{FBn}$, which are fed back to the controller from the current sensors $14_1$-$14_n$, respectively. The controller 20 may use $V_{ref}$ and the fed back $V_{out}$ and $I_{FB1}$-$I_{FBn}$ to conventionally regulate $V_{out}$ to a desired value.

The high-side transistors $22_1$-$22_n$, which are each switched "on" and "off" by the controller 20, are power NMOS transistors that are respectively coupled between input voltages $VIN_1$-$VIN_n$ and the nodes $INT_1$-$INT_n$. Alternatively, the transistors $22_1$-$22_n$ may be other than power NMOS transistors, and may be coupled to a common input voltage. Moreover, the transistors $22_1$-$22_n$ may be integrated on the same die as the controller 20, may be integrated on a same die that is separate from the die on which the controller is integrated, or may be discrete components.

Similarly, the low-side transistors $24_1$-$24_n$, which are each switched on and off by the controller 20, are power NMOS transistors that are respectively coupled between low-side voltages $VL_1$-$VL_n$ and the nodes $INT_1$-$INT_n$ of the phase windings $18_1$-$18_n$. Alternatively, the transistors $24_1$-$24_n$ may be other than power NMOS transistors, and may be coupled to a common low-side voltage such as ground. Moreover, the transistors $24_1$-$24_n$ may be integrated on the same die as the controller 20, may be integrated on a same die that is separate from the die on which the controller is integrated, may be integrated on a same die as the high-side transistors $22_1$-$22_n$, may be integrated on respective dies with the corresponding high-side transistors $22_1$-$22_n$ (e.g., transistors $22_1$ and $24_1$ on a first die, transistors $22_2$ and $24_2$ on a second die, and so on), or may be discrete components.

The filter capacitor 26 is coupled between the regulated output voltage $V_{out}$ and a voltage $VSS_{Cap}$, and works in concert with the windings $18_1$-$18_n$ and an optional filter inductor 28 (if present) to maintain the amplitude of the steady-state ripple-voltage component of $V_{out}$ within a desired range which may be on the order of hundreds of microvolts (μV) to tens of millivolts (mV). Although only one filter capacitor 26 is shown, the converter 10 may include multiple filter capacitors coupled in electrical parallel. Furthermore, $VSS_{Cap}$ may be equal to $VSS_{Controller}$ and to $VL_1$-$VL_n$; for example, all of these voltages may equal ground.

As further discussed below, the filter inductor 28 may be omitted if the leakage inductances $L_{lk1}$-$L_{lkn}$ (discussed below) of the windings 18$_1$-18$_n$ are sufficient to perform the desired inductive filtering function. In some applications, the filter inductor 28 may be omitted to reduce the size and component count of the converter 10.

Each of the windings 18$_1$-18$_n$ of the coupled-inductor assembly 16 may be modeled as a self inductance L and a resistance DCR. For purposes of discussion, only the model components of the winding 18$_1$ are discussed, it being understood that the model components of the other windings 18$_2$-18$_n$ are similar, except for possibly their values.

The self inductance $L_1$ of the winding 18$_1$ may be modeled as two zero-resistance inductances: a magnetic-coupling inductance $L_{C1}$, and a leakage inductance $L_{lk1}$. When a phase current $i_1$ flows through the winding 18$_1$, the current generates a magnetic flux. The value of the coupling inductance $L_{C1}$ is proportional to the amount of this flux that is coupled to other windings 18$_2$-18$_n$, and the value of the leakage inductance $L_{lk1}$ is proportional to the amount of the remaining flux, which is not coupled to the other windings 18$_2$-18$_n$. In one embodiment, $L_{C1}=L_{C2}= \ldots =L_{Cn}$, and $L_{lk1}=L_{lk2}= \ldots =L_{lkn}$, although inequality among the coupling inductances $L_C$, the leakage inductances $L_{lk}$, or both $L_C$ and $L_{lk}$, is contemplated. Furthermore, in an embodiment, the respective magnetic-coupling coefficients between pairs of coupling inductances $L_C$ are equal (i.e., a current through $L_{C1}$ magnetically induces respective equal currents in $L_{C2}, \ldots L_{Cn}$), although unequal coupling coefficients are contemplated.

The resistance $DCR_1$ is the resistance of the winding 18$_1$ when a constant voltage $V_1$ is applied across the winding and causes a constant current $I_1$ to flow through the winding. That is, $DCR_1=V_1/I_1$.

The power supply 10 may provide the regulated voltage $V_{out}$ to a load 30, such as a microprocessor.

Still referring to FIG. 1, alternate embodiments of the power supply 10 are contemplated. Some or all of the phases 12$_1$-12$_n$ may be magnetically uncoupled from one another. For example, phases 12$_1$ and 12$_2$ may be formed on a first core and thus may be magnetically coupled, and phases 12$_3$ and 12$_4$ may be formed on a second core separate from the first core, and thus may be magnetically coupled to one another but magnetically uncoupled form the phases 12$_1$ and 12$_2$. Or, a phase 12 may be magnetically uncoupled from all other phases 12. Furthermore, although described as a multiphase buck converter, the power supply 10 may be any other type of multiphase power supply.

Figure 2:
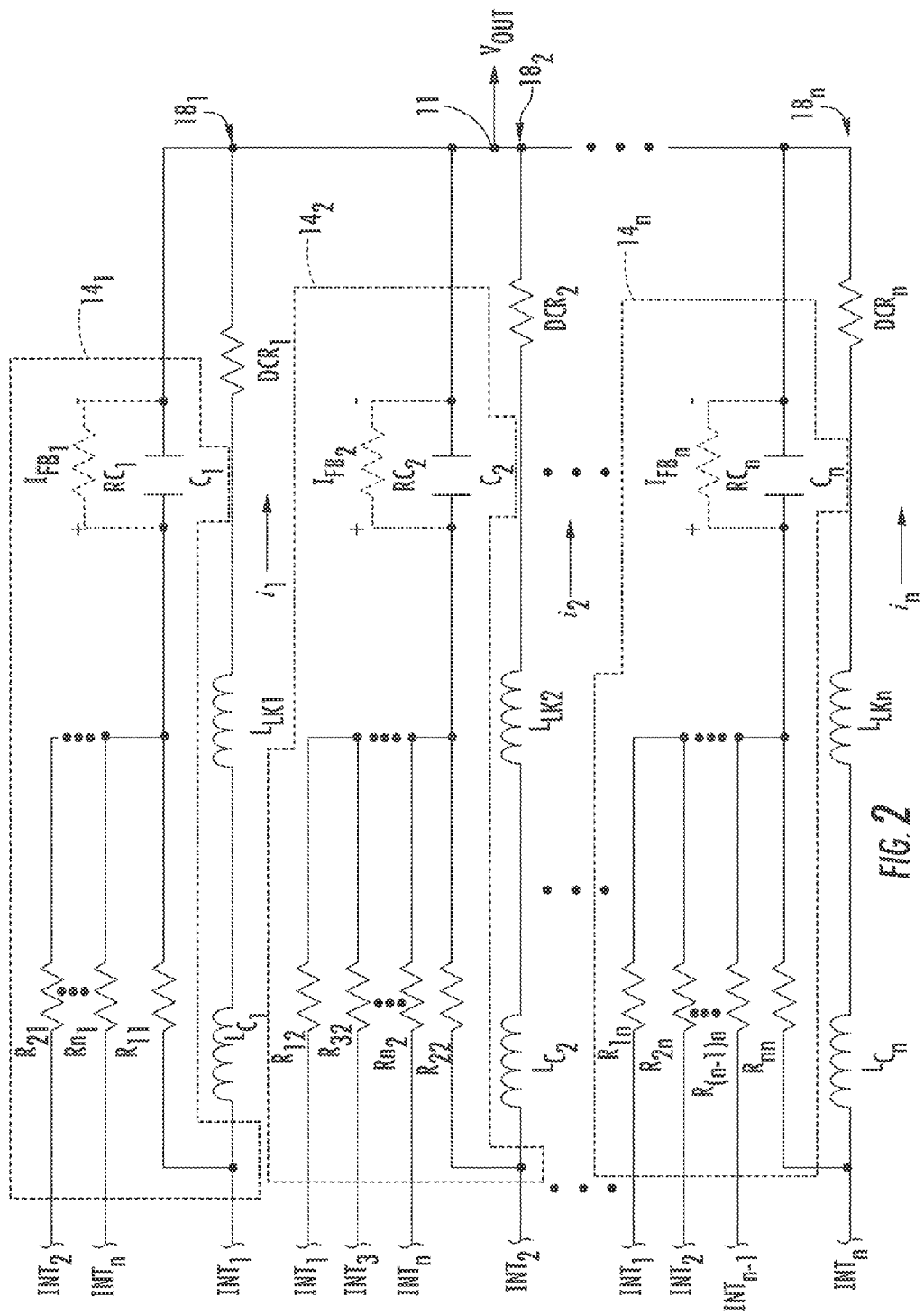
FIG. 2 is a schematic diagram of a portion of the power supply of FIG. 1 including the phase-path windings, and an embodiment of the sensor circuits of FIG. 1.

FIG. 2 is a schematic diagram of a portion of the power supply 10 of FIG. 1 including the windings 18$_1$-18$_n$ and an embodiment of the current sensors 14$_1$-14$_n$. For purposes of discussion, it is assumed that all of the windings 18$_1$ and 18$_n$ are magnetically coupled to one another, and that the filter inductor 28 is omitted from the supply 10. For brevity, only the sensor 14$_1$ is discussed, it being understood that the other sensors 14 are similar except for possibly the values of the components that compose the other sensors.

The sensor 14$_1$ includes a capacitor $C_1$ across which the sense signal $I_{FB1}$ (here a voltage signal) is generated, an optional scaling resistor $RC_1$ coupled across $C_1$, and resistors $R_{11}$-$R_{n1}$, which are respectively coupled between the nodes $INT_1$-$INT_n$ and $C_1$.

The resistor $R_{11}$ couples to $C_1$ a signal (a current in this embodiment) that represents the portion of the phase current $i_1$ that the switching transistors 22$_1$ and 24$_1$ (FIG. 1) cause to flow through the winding 18$_1$.

And the resistors $R_{21}$-$R_{n1}$ each couple to $C_1$ a respective signal (a current in this embodiment) that represents the respective portion of $I_1$ that a respective phase current $i_2$-$i_n$ magnetically induces in the winding 18$_1$. That is, the resistor $R_{21}$ couples to $C_1$ a current that is proportional to the portion of $i_1$ that the phase current $i_2$ magnetically induces in the winding 18$_1$. Similarly, the resistor $R_{31}$ couples to $C_1$ a current that is proportional to the portion of $i_1$ that the phase current $i_3$ magnetically induces in the winding 18$_1$, and so on.

$C_1$ generates from the sum of the signals from $R_{11}$-$R_{n1}$ the sense voltage $I_{FB1}$, which has the same phase as $i_1$ and which has an amplitude that is proportional to the amplitude of $i_1$.

Therefore, a power-supply controller, such as the controller 20 of FIG. 1, may obtain from $I_{FB1}$ an accurate representation of the instantaneous phase and amplitude of the phase current $i_1$.

In a similar manner, the capacitors $C_2$-$C_n$ respectively generate the sense voltages $I_{FB2}$-$I_{FBn}$, from which a power-supply controller, such as the controller 20 of FIG. 1, may obtain accurate representations of the instantaneous phases and amplitudes of the phase currents $i_2$-$i_n$.

Figure 3:
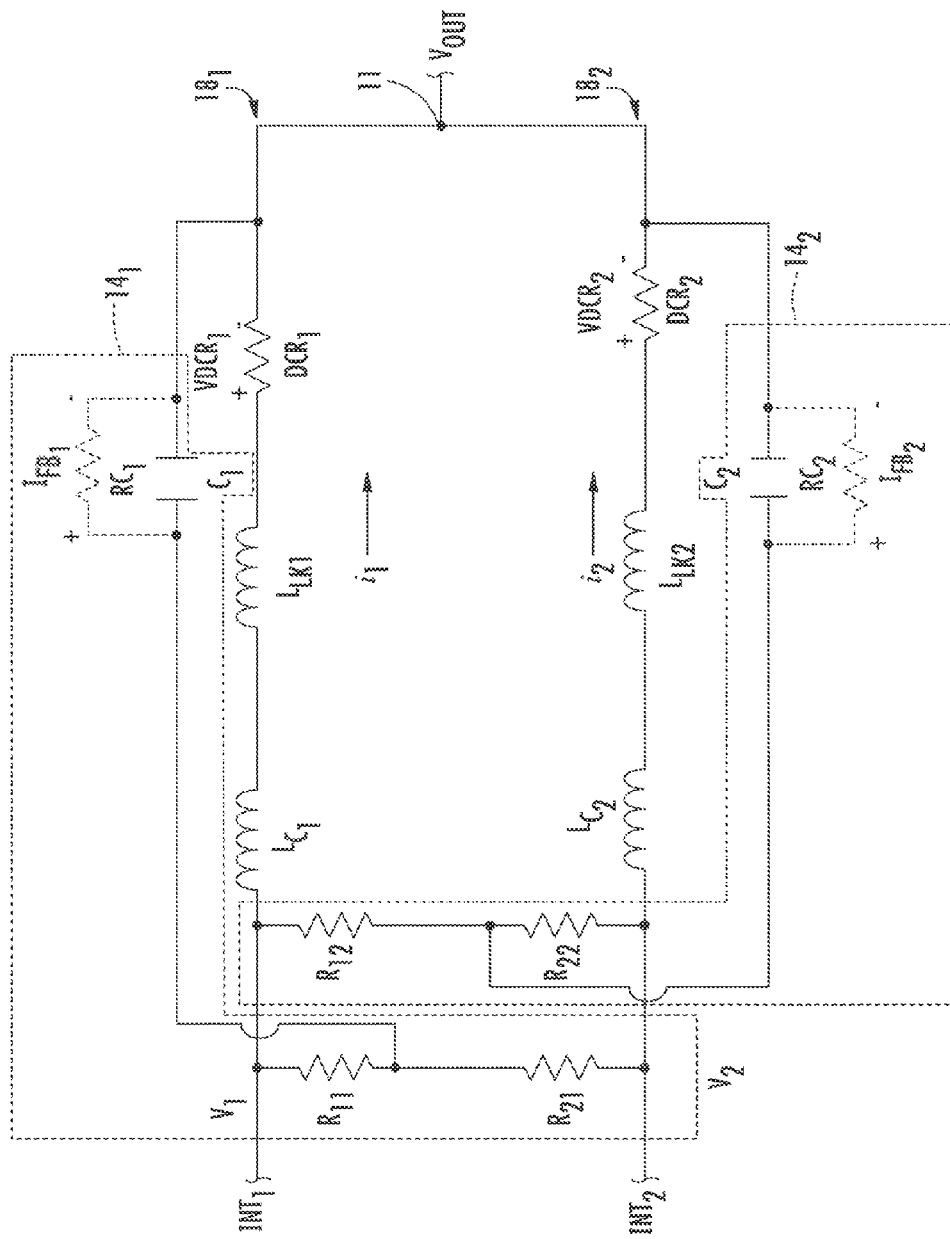
FIG. 3 is a schematic diagram of a two-phase version of the power-supply portion of FIG. 2.
Figure 4:
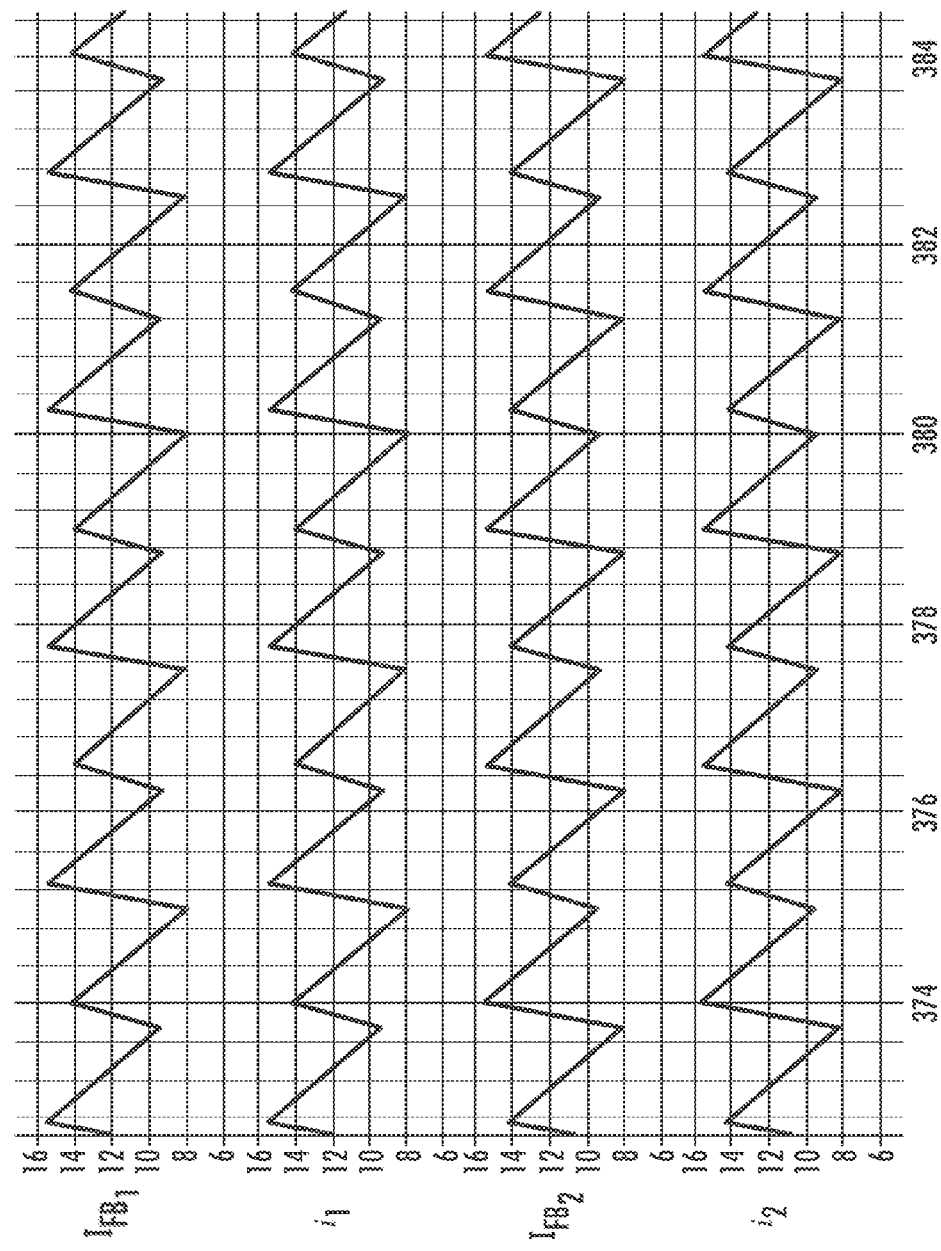
FIGS. 4A and 4C are timing diagrams of sense signals that are generated by the sensor circuits of FIG. 3.
FIGS. 4B and 4D are timing diagrams of the phase currents flowing through the windings of FIG. 3.

FIG. 3 is a schematic diagram of a two-phase (n=2) version of the power-supply portion of FIG. 2.

Referring to FIG. 3, an embodiment of a technique for calculating values for $R_{11}$, $R_{12}$, $R_{21}$, $R_{22}$, $C_1$, and $RC_1$ (if present) is presented. To simplify the presentation, it is assumed that $R_{11}=R_{22}=R_1$, $R_{21}=R_{12}=R_2$, $L_{C1}=L_{C2}=L_C$, $L_{lk1}=L_{lk2}=L_{lk}$, $DCR_1=DCR_2=DCR$, and $RC_1=RC_2=\infty$ (i.e., $RC_1$ and $RC_2$ are omitted) in equations (1)-(16) below. It is, however, understood that the disclosed embodiment may be extrapolated to a more general embodiment of FIGS. 2-3 for $R_{11} \neq R_{22}$, $R_{21} \neq R_{12}$, $L_{C1} \neq L_{C2}$, $L_{lk1} \neq L_{lk2}$, $DCR_1 \neq DCR_2$, $RC_1 \neq RC_2 \neq \infty$, and n>2.

Still referring to FIG. 3, the following equations are derived from the general relationship between the currents through and the voltages across reverse-coupled inductors—the windings 18$_1$ and 18$_2$ are reversed coupled when a positive current flowing through the winding 18$_1$ into the node 11 induces a positive current in the winding 18$_2$ also flowing into the node 11.

$$V_1 = s(L_{lk} + L_C)i_1 - s \cdot L_C \cdot i_2 + DCR \cdot i_1 + V_{out} \quad (1)$$

$$V_2 = s(L_{lk} + L_C)i_2 - s \cdot L_C \cdot i_1 + DCR \cdot i_2 + V_{out} \quad (2)$$

$$i_2 = \frac{V_2 - V_{out} + s \cdot L_C \cdot i_1}{s(L_{lk} + L_C) + DCR} \quad (3)$$

where $V_1$ and $V_2$ are the voltages at nodes $INT_1$ and $INT_2$, respectively.

From equations (1)-(3), one may derive the following equation for $i_1$:

$$i_1 = \frac{(V_1 - V_{out}) \cdot [s(L_{lk} + L_C) + DCR] + s \cdot L_C(V_2 - V_{out})}{[s(L_{lk} + L_C) + DCR]^2 - [s \cdot L_C]^2} \quad (4)$$

Furthermore, where $R_{11}=R_1$ and $R_{21}=R_2$ are the resistors coupled to the capacitor $C_1$, one may derive the following equation for the voltage $I_{FB1}$ across $C_1$:

$$I_{FB1} = \frac{V_1 \cdot R_2 + V_2 \cdot R_1 - 2V_{out}(R_1 + R_2)}{R_1 + R_2 + s \cdot R_1 \cdot R_2 \cdot C_1} \quad (5)$$

Because the voltage $VDCR_1$ across $DCR_1$ equals $i_1 \cdot DCR_1$, $VDCR_1$ has the same phase as $i_1$, and has an amplitude that is proportional (by a factor $DCR_1$) to the amplitude of $i_1$; as discussed above in conjunction with FIG. 1, these attributes are suitable for $I_{FB1}$.

Unfortunately, $DCR_1$ is a modeled component, and one does not have physical access to the voltage $VDCR_1$ across it.

But, one can set $I_{FB1} = VDCR_1 = i_1 \cdot DCR_1$ according to the following equation, which is derived from equations (4) and (5):

$$\frac{V_1 \cdot R_2 + V_2 \cdot R_1 - 2V_{out}(R_1 + R_2)}{R_1 + R_2 + s \cdot R_1 \cdot R_2 \cdot C_1} = \frac{(V_1 - V_{out}) \cdot [s(L_{lk} + L_C) + DCR] + s \cdot L_C(V_2 - V_{out})}{[s(L_{lk} + L_C)DCR]^2 - [s \cdot L_C]^2} \cdot DCR \quad (6)$$

From equation (6), one can derive the following two equations:

$$\frac{R_2 \cdot V_1}{R_1 + R_2 + s \cdot R_1 \cdot R_2 \cdot C_1} = \frac{V_1 \cdot [s \cdot (L_{lk} + L_C) + DCR]}{[s(L_{lk} + L_C) + s \cdot L_C + DCR] \cdot [s \cdot L_{lk} + DCR]} \cdot DCR \quad (7)$$

$$\frac{R_1 \cdot V_2}{R_1 + R_2 + s \cdot R_1 \cdot R_2 \cdot C_1} = \frac{s \cdot L_C \cdot V_2}{[s(L_{lk} + L_C) + s \cdot L_C + DCR] \cdot [s \cdot L_{lk} + DCR]} \cdot DCR \quad (8)$$

Referring to FIG. 1, if one assumes that the controller 20 switches the transistors 22 and 24 at a relatively high frequency, e.g., 100 KHz or higher (this assumption applies in many applications of multiphase power supplies), then one may assume that $s(L_{lk}+L_C)+sL_C$ is much greater than DCR. Applying these assumptions, equations (7) and (8) respectively reduce to the following equations:

$$\frac{R_2 \cdot \left(1 + s \cdot \frac{L_{lk}}{DCR}\right)}{(R_1 + R_2) \cdot \left(1 + s \cdot \frac{R_1 \cdot R_2}{R_1 + R_2} \cdot C_1\right)} = \frac{L_{lk} + L_C}{L_{lk} + 2L_C} \quad (9)$$

$$\frac{R_1 \cdot \left(1 + s \cdot \frac{L_{lk}}{DCR}\right)}{(R_1 + R_2) \cdot \left(1 + s \cdot \frac{R_1 \cdot R_2}{R_1 + R_2} \cdot C_1\right)} = \frac{L_C}{L_{lk} + 2L_C} \quad (10)$$

From equations (9) and (10), one may derive the following design equations for the sensor circuit $14_1$ of FIG. 3:

$$\frac{R_2}{R_1 + R_2} = \frac{L_{lk} + L_C}{L_{lk} + 2L_C} \quad (11)$$

$$\frac{R_1}{R_1 + R_2} = \frac{L_C}{L_{lk} + 2L_C} \quad (12)$$

$$\frac{L_{lk}}{DCR} = \frac{R_1 \cdot R_2}{R_1 + R_2} \cdot C_1 \quad (13)$$

Therefore, by selecting the components $R_{11}=R_1$, $R_{21}=R_2$, and $C_1$ ($L_{C1}=L_C$, $L_{lk1}=L_{lk}$, and $DCR_1=DCR$ are assumed to be known quantities for purposes of this disclosure) of the sensor circuit $14_1$ such that they satisfy the design equations (11)-(13), the results are that $I_{FB1} \approx i_1 \cdot DCR_1$, and therefore, that $I_{FB1}$ has approximately the same phase as $i_1$, and has an amplitude that is approximately proportional to (i.e., that has approximately the same amplitude profile as) the amplitude of $i_1$. Furthermore, because at least in some applications the design equation (12) may be redundant, one may design the sensor circuit $14_1$ by selection component values that satisfy only the equations (11) and (13).

FIGS. 4A-4D are respective timing diagrams of $I_{FB1}$, $i_1$, $I_{FB2}$, and $i_2$ of FIG. 3 for a two phase embodiment of the power-supply 10 of FIG. 1 for the following component values, which satisfy the design equations (11)-(13): $L_{lk1}=L_{lk2}=200$ nanohenries (nH), $L_{C1}=L_{C2}=500$ nH, $DCR_1=DCR_2=2$ milliohms (mΩ), $C_1=C_2=0.01$ microfarads (μF), $R_{11}=R_{22}=17$ kiloohms (KΩ), and $R_{12}=R_{21}=24$ KΩ. Although $I_{FB1}$ and $I_{FB2}$ are voltages, the timing diagrams of FIGS. 4A and 4C are in units of Amperes (current) because $I_{FB1}$ and $I_{FB2}$ respectively represent the phase currents $i_1$ and $i_2$. For purposes of plotting only, $I_{FB1}$ and $I_{FB2}$ have been normalized by setting $DCR_1=DCR_2=1$ such that $I_{FB1}$ has the same amplitude profile and phase as $i_1$, and $I_{FB2}$ has the same amplitude profile and phase as $i_2$. Of course the power-supply controller 20 (FIG. 1) may adjust the amplitude of the $I_{FB1}$ and $I_{FB2}$ within the controller by a scale factor other than unity.

Referring again to FIGS. 1-4D, alternate embodiments of the disclosed technique for designing the sensor circuits $14_1$-$14_n$ are contemplated. For example, equations (1)-(13) may be extrapolated for the design of the power supply 10 having more than n=2 magnetically coupled phases $12_1$ and $12_2$ (i.e., for n>2). But the equations (1)-(13) may also be suitable for an embodiment of the power supply 10 having only pairs of magnetically coupled phases 12, e.g., phase $12_1$ coupled to phase $12_2$ only, phase $12_3$ coupled to phase $12_4$ only, and so on. Furthermore, one may modify the equations (1)-(13) to cover an embodiment of the power supply 10 where one or more components of the sensor circuit 14 and winding 18 of one phase 12 have different values than the corresponding one or more components of the sensor circuit 14 and winding 8 of another phase 12. Moreover, one may modify equations (9)-(13) so that they are not simplified based on the assumption that the controller 20 switches the phases 12 at a relatively high frequency. In addition, although the sensor circuits 14 are described as being useful to sense the currents through magnetically coupled phases 12, one may use the sensor circuits 14 or similar sensor circuits to sense the currents through magnetically uncoupled phases. Furthermore, the disclosed technique, or a modified version thereof, may be suitable for designing the sensor circuits of a multiphase power supply other than a buck converter. Moreover, although an embodiment of a technique for designing the sensor circuit 14, is disclosed the same or a similar embodiment may be used to design the sensor circuit $14_2$. In addition, although the sensor circuits $14_1$-$14_n$ are disclosed as each being coupled to the intermediate nodes $INT_1$-$INT_2$, the sensor circuits may be coupled to other non-output nodes of phases $12_1$-$12_n$. The output node of a phase 12 is the node where all of the phases are coupled together, for example the node 11 in FIG. 2 where the filter inductor 28 is omitted.

Referring again to FIG. 3, one may wish to include the optional resistor $RC_1$ in the sensor circuit $14_1$ to scale the voltage $I_{FB1}$ such that $K_1 \cdot I_{FB1} = i_1 \cdot DCR_1$, and thus $I_{FB1} = (i_1 \cdot DCR_1)/K_1$, where $K_1 \leq 1$ ($K_1 = 1$ when $RC_1$ is omitted). When $RC_1$ is present and n=n, then the design equations (11) and (13) may be respectively modified into the following equations, assuming that the values of $L_C$, $L_{lk}$, and DCR are the same for each winding $18_1$-$18_n$ (because the design equation (12) may redundant as discussed above, the equation into which one may modify equation (12) when $RC_1$ is present is omitted for brevity):

$$\frac{R_{11}}{R_{11} + R_{21} + \ldots + R_{n1}} = \frac{L_{lk} + L_C}{L_{lk} + nL_C} \quad (14)$$

$$\frac{L_{lk}}{DCR} = \frac{R_{11} \cdot R_{21} \cdot \ldots \cdot R_{n1} \cdot RC_1}{R_{11} + R_{21} + \ldots + R_{n1}} \cdot C_1 \quad (15)$$

And $K_1$ is given by the following equation:

$$K_1 = \frac{(R_{11} + R_{21} + \ldots + R_{n1}) \cdot RC_1}{(R_{11} + R_{21} + \ldots + R_{n1}) \cdot RC_1 + R_{11} \cdot R_{21} \cdot \ldots \cdot R_{n1}} \quad (16)$$

The modified design equations for the components of the sensor circuits $14_2$-$14_n$ and the equations for the scale factors $K_2$-$K_n$ may be respectively similar to equations (14)-(16). Furthermore, equations (14)-(16) may be modified where $L_C$, $L_{lk}$, and DCR are not the same for each winding $18_1$-$18_n$.

Figure 5:
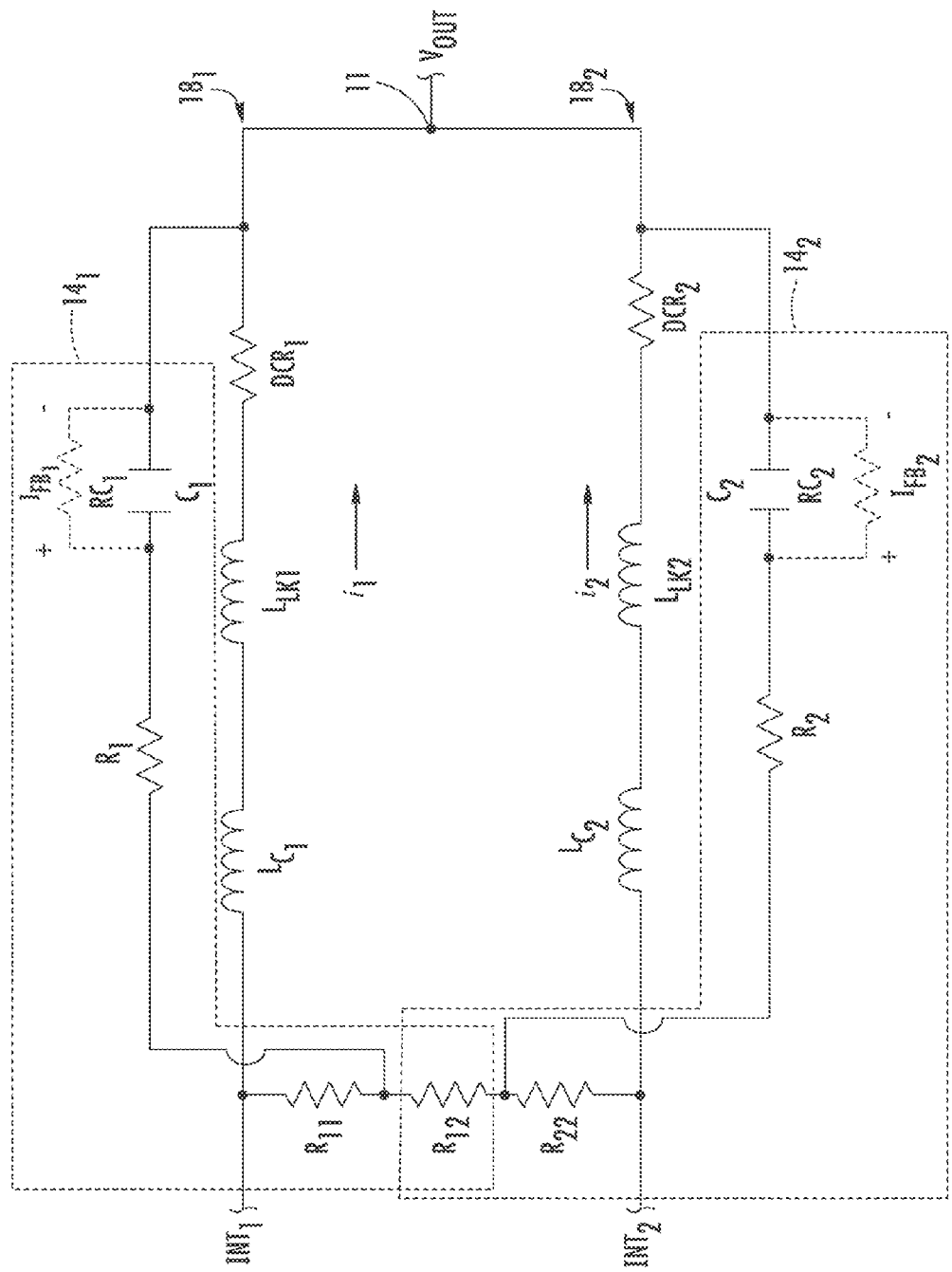
FIG. 5 is a schematic diagram of a portion of a two phase version of the powers supply of FIG. 1 including the phase-path windings and another embodiment of the sensor circuits of FIG. 1.

FIG. 5 is schematic diagram of a portion of a two-phase (n=2) version of the power supply 10 of FIG. 1 including the windings $18_1$ and $18_2$ (which we magnetically coupled) and another embodiment of the sensor circuits $14_1$ and $14_2$. For purposes of discussion, it is assumed that the filter inductor 28 is omitted from the power supply 10. For brevity, only the sensor circuit $14_1$ is discussed, it being understood that the other sensor circuit $14_2$ is similar except for possibly the values of the components that compose the sensor circuit $14_2$.

The sensor $14_1$ includes a capacitor $C_1$ across which the sense signal $I_{FB1}$ (here a voltage signal) is generated, an optional scaling resistor $RC_1$ across the capacitor $C_1$, a resistor $R_1$ coupled to the capacitor $C_1$, and a resistor $R_{11}$, which is coupled between the phase intermediate node $INT_1$ and the resistor $R_1$. The resistors $R_{11}$ and $R_1$ couple to $C_1$ a signal (a current in this embodiment) that represents the portion of the phase current $i_1$ that the switching transistors $22_1$ and $24_1$ (FIG. 1) cause to flow through the winding $18_1$.

Similarly, the sensor circuit $14_2$ includes a capacitor $C_2$ across which the sense signal $I_{FB2}$ (here a voltage signal) is generated, an optional scaling resistor $RC_2$ across the capacitor $C_2$, a resistor $R_2$ coupled to the capacitor $C_2$, and a resistor $R_{22}$, which is coupled between the phase intermediate node $INT_2$ and the resistor $R_2$. The resistors $R_{22}$ and $R_2$ couple to $C_2$ a signal (a current in this embodiment) that represents the portion of the phase current $i_2$ that the switching transistors $22_2$ and $24_2$ (FIG. 1) cause to flow through the winding $18_2$.

The sensor circuits $14_1$ and $14_2$ also "share" a resistor $R_{12}$, which is coupled between the resistors $R_1$ and $R_2$ and also between the resistors $R_{11}$ and $R_{22}$. The resistors $R_{22}$, $R_{12}$, and $R_1$ couple to $C_1$ a signal (a current in this embodiment) that represents the portion of the phase current $i_1$ that the phase current $i_2$ magnetically induces in the winding $18_1$. That is, the resistors $R_{22}$, $R_{12}$, and $R_1$ couple to $C_1$ a current that is proportional to the portion of $i_1$ that $i_2$ magnetically induces in the winding $18_1$. Similarly, the resistors $R_{11}$, $R_{12}$, and $R_2$ couple to $C_2$ a signal (a current in this embodiment) that represents the portion of the phase current $i_2$ that the phase current $i_1$ magnetically induces in the winding $18_2$.

One may extrapolate the sensor circuit $14_1$ for use in the power supply 10 (FIG. 1) where n>2 by including in the sensor circuit a respective resistive network between the node $INT_1$ and all the other nodes $INT_2$-$INT_n$, where each resistive network may be similar to the network of resistors $R_{11}$, $R_{12}$, and $R_{22}$, except possibly for the values of these resistors. The resistor $R_1$ would be coupled to the respective nodes of these resistive networks corresponding the node between $R_{11}$ and $R_{22}$ in FIG. 5. And the resistors corresponding to the resistor $R_2$ in FIG. 5 would be respectively coupled to the nodes corresponding to the node between $R_{12}$ and $R_{22}$ in FIG. 5.

One may extrapolate the sensor circuit $14_2$ for use in the power supply 10 (FIG. 1) where n>2 in a similar manner, and the sensor circuits $14_3$-$14_n$ may each be similar to the sensor circuits $14_1$ and $14_2$, except possibly for the values of the resistors.

Still referring to FIG. 5, in an embodiment one may derive design equations for the sensor circuit $14_1$ in a manner similar to that presented above in conjunction with FIG. 3. Assuming an embodiment of the sensor circuit $14_1$ where $L_{c1}=L_{c2}=L_c$, $L_{lk1}=L_{lk2}=L_{lk}$, $DCR_1=DCR_2=DCR$, $R_{11}=R_{22}=R_A$, and $R_{12}=R_B$, the design equations for such an embodiment are as follows:

$$\frac{R_A}{R_A + R_B} = \frac{L_C}{L_{lk} + 2L_C} \quad (17)$$

$$\frac{L_{lk}}{DCR} = R_1 \cdot C \quad (18)$$

$$K_1 = \frac{RC_1}{R_1 + RC_1} \quad (19)$$

Referring again to FIGS. 1 and 5, alternate embodiments of the disclosed technique for designing the sensor circuits $14_1$-$14_n$ of FIG. 5 are contemplated. For example, equations (17)-(19) may be modified for the design of the power supply 10 having more than n=2 magnetically coupled phases $12_1$ and $12_2$ (i.e., for n>2). But the equations (17)-(19) may also be suitable for an embodiment of the power supply 10 having only pairs of magnetically coupled phases 12, e.g., phase $12_1$ coupled to phase $12_2$ only, phase $12_3$ coupled to phase $12_4$ only, and so on. Furthermore, one may modify the equations (17)-(19) to cover an embodiment of the power supply 10 where one or more components of the sensor circuit 14 and winding 18 of one phase 12 have different values than the corresponding one or more components of the sensor circuit 14 and winding 18 of another phase 12. Moreover, one may modify equations (17)-(19) so that they are not simplified based on the assumption that the controller 20 switches the phases 12 at a relatively high frequency. In addition, although the sensor circuits 14 of FIG. 5 are described as being useful to sense the currents through magnetically coupled phases 12, one may use the sensor circuits 14 or similar sensor circuits to sense the currents through magnetically uncoupled phases. Furthermore, the disclosed technique, or a modified version thereof, may be suitable for designing the sensor circuits of a multiphase power supply other than a buck converter. Moreover, although an embodiment of a technique for designing the sensor circuit 14, is disclosed, the same or a similar embodiment may be used to design the sensor circuit 14₂. In addition, although the sensor circuits 14₁-14₂ are disclosed as each being coupled to the intermediate nodes INT₁-INT₂, the sensor circuits 14₁-14₂ (and 14₃-14ₙ of present) may be coupled to other non-output nodes of the phases 12₁-12₂ (and 12₃-12ₙ of present).

Figure 6:
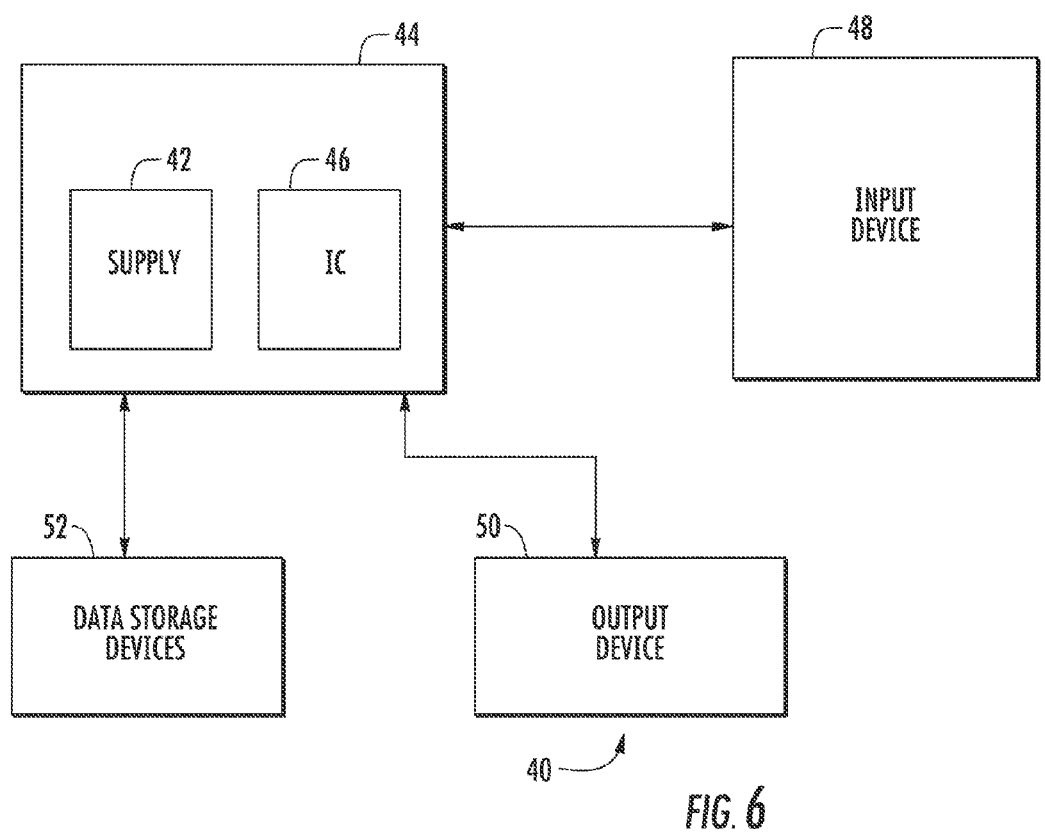
FIG. 6 is a block diagram of an embodiment of a computer system having a power supply that includes sensor circuits that are the same as or similar to one or more of the embodiments discussed above in conjunction with FIGS. 2-3 and 5.

FIG. 6 is a block diagram of an embodiment of a system 40 (here a computer system), which may incorporate a multiphase power supply 42 (such as the multiphase power supply 10 of FIG. 1) that includes one or more phase-current sensor circuits that are the same as or that are similar to embodiments of one or more of the current sensor circuits 14 of FIGS. 2, 3, and 5.

The system 40 includes computer circuitry 44 for performing computer functions, such as executing software to perform desired calculations and tasks. The circuitry 44 typically includes a controller, processor, or one or more other integrated circuits (ICs) 46, and the power supply 42, which provides power to the IC(s) 46—these IC(s) compose(s) the load of the power supply. The power supply 42, or a portion thereof, may be disposed on the same IC die as one or more of the ICs 46, or may be disposed on a different IC die.

One or more input devices 48, such as a keyboard or a mouse, are coupled to the computer circuitry 44 and allow an operator (not shown) to manually input data thereto.

One or more output devices 100 are coupled to the computer circuitry 44 to provide to the operator data generated by the computer circuitry. Examples of such output devices 50 include a printer and a video display unit.

One or more data-storage devices 52 are coupled to the computer circuitry 44 to store data on or retrieve data from external storage media (not shown). Examples of the storage devices 52 and the corresponding storage media include drives that accept hard and floppy disks, tape cassettes, compact disk read-only memories (CD-ROMs), and digital-versatile disks (DVDs).

From the foregoing it will be appreciated that, although specific embodiments have been described herein for purposes of illustration, various modifications may be made without deviating from the spirit and scope of this disclosure. Furthermore, where an alternative is disclosed for a particular embodiment, this alternative may also apply to other embodiments even if not specifically stated.

The invention claimed is:

1. A power supply, comprising:
a supply output node configured to carry a regulated output signal;
phase paths each having a respective phase-path output node coupled to the supply output node, each having a respective phase-path non-output node, and each configured to carry a respective phase current, at least two of the phase paths inductively coupled to one another; and
at least one sensor circuit each having a sensor node coupled to the phase-path non-output nodes of the at least two phase paths and configured to generate a sense signal that represents the phase current flowing through a respective one of the at least two phase paths.

2. The power supply of claim 1 wherein all of the phase paths are magnetically coupled to one another.

3. A system, comprising:
a power supply, including
a supply output node configured to carry a regulated output signal,
phase paths each having a respective phase-path non-output node, each having a respective phase-path output node coupled to the supply output node, and each configured to carry a respective phase current, at least two of the phase paths inductively coupled to one another,
at least one sensor circuit each having a sensor node coupled to the phase-path non-output nodes of the at least two phase paths and each configured to generate a respective sense signal that represents the phase current flowing through a respective one of the at least two phase paths,
phase-path drivers each coupled to a phase-path non-output node of a respective one of the phase paths, and
a power-supply controller coupled to the at least one sensor circuit and the phase-path drivers and configured to regulate the output signal by controlling the at least one phase-path driver coupled to the respective one of the at least two phase paths in response to the respective sense signal; and
a load coupled to the supply output node of the power supply.

4. The power supply of claim 3 wherein the regulated output signal includes a regulated output voltage.

5. A power supply, comprising:
a supply output node configured to carry a regulated output signal;
phase paths each having a respective phase-path output node coupled to the supply output node, each having a respective phase-path non-output node, and each configured to carry a respective phase current, at least two of the phase paths magnetically coupled to one another; and
at least one sensor circuit each coupled to the at least two phase paths and each configured to generate a respective sense signal that represents the phase current flowing through a respective one of the at least two phase paths.

6. A method, comprising:
driving first and second inductively coupled power-supply phase paths with respective first and second driving signals to generate an output signal;
generating, in response to the first and second driving signals, a first sense signal that represents a first phase-path current flowing through the first inductively coupled power-supply phase path; and
regulating the output signal in response to the first sense signal.

7. The method of claim 6, further comprising:
generating, in response to the first and second driving signals, a second sense signal that represents a second phase-path current flowing through the second inductively coupled power-supply phase path; and
regulating the output signal in response to the second sense signal.

8. A power supply, comprising:
a supply output node configured to carry a regulated output signal;
at least two phase paths each having a respective phase-path output node coupled to the supply output node, each having a respective phase-path non-output node, and each configured to carry a respective phase current; and at least one sensor circuit each coupled to the phase-path non-output nodes of the at least two phase paths and each configured to generate a respective sense signal that represents the phase current flowing through a respective one of the at least two phase paths.

9. A method, comprising:

generating a first phase-path non-output signal with a first power-supply phase path;

generating a second phase-path non-output signal with a second power-supply phase path;

generating an output signal with the first and second power-supply phase paths;

generating a first sense signal in response to the first and second phase-path non-output signals, the first sense signal representing a first phase-path current flowing through the first power-supply phase path; and regulating the output signal in response to the first sense signal.

10. The method of claim 9, further comprising:

generating a second sense signal in response to the first and second phase-path non-output signals, the second sense signal representing a second phase-path current flowing through the second power-supply phase path; and regulating the output signal in response to the second sense signal.

11. A power supply, comprising:

an output node configured to provide a regulated output signal;

inductively coupled phase paths each configured to provide a respective phase current to the output node, the respective phase current having a respective magnitude and a respective phase; and a first sensor circuit configured to generate a first sense signal that represents the respective magnitude and the respective phase of the respective phase current flowing through a first one of the phase paths.

12. The power supply of claim 11 wherein the first one of the phase paths includes an inductance.

13. The power supply of claim 12 wherein the first sensor circuit includes a capacitance coupled across the inductance of the first one of the phase paths.

14. The power supply of claim 13 wherein the first sensor circuit is configured to generate the first sense signal across the capacitance.

15. The power supply of claim 11 wherein the first sensor circuit includes:

an impedance coupled to the first one of the phase paths; and one or more other impedances each coupled to the impedance and to a respective other one of the phase paths.

16. The power supply of claim 15 wherein the impedance and the one or more other impedances each include a respective resistance.

17. The power supply of claim 13 wherein the first sensor circuit includes:

an impedance coupled to the first one of the phase paths and to the capacitance; and one or more other impedances each coupled to the capacitance and to a respective other one of the phase paths.

18. The power supply of claim 11, further comprising a second sensor circuit configured to generate a second sense signal that represents the respective magnitude and the respective phase of the respective phase current flowing through a second one of the phase paths.

19. The power supply of claim 11 wherein the first sensor circuit is coupled to the phase paths.

20. A method, comprising:

generating phase currents with respective magnetically coupled phase paths; and generating a first sense signal that represents a magnitude and a phase of a first one of the phase currents.

21. The method of claim 20 wherein generating the first sense signal includes generating the first sense signal in response to signals respectively generated by the phase paths.

22. The method of claim 20 wherein generating the first sense signal includes generating the first sense signal in response to voltages each at a node of a respective one of the phase paths.

23. The method of claim 20, further comprising generating a second sense signal that represents a magnitude and a phase of a second one of the phase currents.

* * * * *

UNITED STATES PATENT AND TRADEMARK OFFICE
CERTIFICATE OF CORRECTION

PATENT NO. : 9,602,005 B2  
APPLICATION NO. : 14/203017  
DATED : March 21, 2017  
INVENTOR(S) : Xiao et al.

Page 1 of 1

It is certified that error appears in the above-identified patent and that said Letters Patent is hereby corrected as shown below:

In the Specification

In Column 1, Line 7, delete "2008;" and insert -- 2008, now Pat. No 8,704,500; --, therefor.

In Column 1, Line 9, delete "Nos." and insert -- No. --, therefor.

In Column 1, Line 10, delete "Nos." and insert -- No. --, therefor.

In Column 3, Line 49, delete "form" and insert -- from --, therefor.

In Column 4, Line 7, delete "$I_1$" and insert -- $i_1$ --, therefor.

In Column 5, Line 6, delete "$i_1$ $DCR_1$," and insert -- $i_1 \cdot DCR_1$, --, therefor.

In Column 7, Line 34, delete "is" and insert -- is a --, therefor.

In the Claims

In Column 10, Line 2, in Claim 3, delete "including" and insert -- including: --, therefor.

Signed and Sealed this  
Tenth Day of July, 2018

Andrei Iancu  
*Director of the United States Patent and Trademark Office*